United States Patent
Ha

(10) Patent No.: US 8,443,699 B2
(45) Date of Patent: May 21, 2013

(54) TORQUE CONTROL WRENCH FOR BOTH LEFT-HAND THREAD AND RIGHT-HAND THREAD

(75) Inventor: Yong Su Ha, Kyunggi-Do (KR)

(73) Assignee: Sewon PM Tech Co., Ltd, Kimpo-Si, Kyeonggi-Do (KR)

( * ) Notice: Subject to any disclaimer, the term of this patent is extended or adjusted under 35 U.S.C. 154(b) by 184 days.

(21) Appl. No.: 13/086,740

(22) Filed: Apr. 14, 2011

(65) Prior Publication Data

US 2011/0252929 A1    Oct. 20, 2011

(30) Foreign Application Priority Data

Apr. 19, 2010  (KR) .................. 10-2010-0035972

(51) Int. Cl.
  *B25B 17/02*  (2006.01)
  *B25B 23/142*  (2006.01)
(52) U.S. Cl.
  USPC ........................................ 81/57.31; 81/475
(58) Field of Classification Search
  USPC ................. 81/475, 476, 57.3, 57.31, 474
  See application file for complete search history.

(56) References Cited

U.S. PATENT DOCUMENTS

| | | | |
|---|---|---|---|
| 3,012,456 A * | 12/1961 | Dracka .......................... | 81/475 |
| 4,043,228 A * | 8/1977 | Venezio ......................... | 81/57.3 |
| RE29,993 E * | 5/1979 | Wagner ......................... | 475/270 |
| 4,346,633 A * | 8/1982 | Rendl .............................. | 81/475 |
| 4,535,653 A * | 8/1985 | Coburn ........................ | 475/270 |
| 4,627,310 A * | 12/1986 | Coburn ........................ | 475/270 |
| 4,802,387 A * | 2/1989 | Williams, III ............... | 74/810.1 |
| 5,616,095 A * | 4/1997 | Pruitt ............................ | 475/178 |
| 6,742,417 B2 * | 6/2004 | Ha ............................... | 81/57.36 |
| 7,222,559 B2 | 5/2007 | Wang | |
| 7,490,535 B2 * | 2/2009 | Ha .................................. | 81/475 |

FOREIGN PATENT DOCUMENTS

| | | |
|---|---|---|
| KR | 2020000003297 | 2/2000 |
| KR | 100798256 B1 | 1/2008 |

* cited by examiner

*Primary Examiner* — David B Thomas
(74) *Attorney, Agent, or Firm* — Young & Thompson

(57) ABSTRACT

A torque control wrench for both a left-hand thread and a right-hand thread is disclosed. The torque control wrench includes a wrench unit having a transmission unit, a movable shaft engaged with the transmission unit, for rotating the transmission unit with external force, and a socket for receiving rotational force at a rotation speed changed by the transmission unit and tightening or loosening a bolt with the received rotational force, a handle for generating the rotational force with which the socket tightens or loosens the bolt, and a torque controller between the wrench unit and the handle, for controlling a torque applied from the handle to the socket, including a clutch for rotating along with rotation of the handle and thus rotating the movable shaft and, if a torque equal to or greater than a preset torque value is applied, rotating idly, and a clutch torque controller for controlling the torque applied from the handle to the clutch.

4 Claims, 9 Drawing Sheets

TORQUE CONTROL WRENCH FOR BOTH LEFT-HAND THREAD AND RIGHT-HAND THREAD

This application claims the benefit of Korean Patent Application No. 10-2010-0035972, filed on Apr. 19, 2010, which is hereby incorporated by reference as if fully set forth herein.

BACKGROUND OF THE INVENTION

1. Field of the Invention

The present invention relates to a torque control wrench for both a left-hand thread and a right-hand thread, and more particularly, to a torque control wrench for both a left-hand thread and a right-hand thread, which can set a torque value matching the strength of a bolt to be tightened and, if a torque equal to or greater than the set torque value is applied to the bolt, can discontinue rotation of a socket that is tightening the bolt by means of a torque controller, thereby tightening the bolt with a precise torque.

2. Discussion of the Related Art

A torque wrench is a tool used to precisely apply a specific torque (i.e. rotational force) to a bolt and a nut.

A vehicle is typically an assembly of a large number of parts tightened with bolts. These bolts vary in strength levels and a strength level is marked on the head of each bolt.

As bolts differ in strength levels depending on their types, the bolts have different maximum torques with which they can be tightened. If a wrench tightens a bolt with a greater torque than the strength of the bolt can tolerate, the head of the bolt may be deformed or the thread of the bolt may be broken off. Accordingly, a torque wrench tightens a bolt with a specified torque according to the strength level of the bolt.

FIG. 9 illustrates a conventional torque wrench.

Referring to FIG. 9, the conventional torque wrench is a popular one used to tighten or loosen bolts in exchanging tires for a vehicle.

The conventional torque wrench includes a wrench unit 210 and a handle 220. The wrench unit 210 has a socket 213 formed at an end thereof, for tightening or loosening a bolt and a male thread 211 formed on an outer circumferential surface thereof. The handle 220 is provided, on an inner circumferential surface thereof, with a female thread 221 for being screwed onto the male thread 211.

The conventional torque wrench is configured so as to control a tightening torque on a bolt by adjusting the length of the handle 220 relative to the length of the wrench unit 210.

However, the torque control mechanism of the conventional torque wrench is not effective in tightening a bolt with a precise torque because a torque applied to the bolt depends on an operator.

Moreover, the operator may overtighten the bolt without noticing the fully tightened state of the bolt. Consequently, the bolt may be worn out.

SUMMARY OF THE INVENTION

Accordingly, the present invention is directed to a torque control wrench for both a left-hand thread and a right-hand thread that substantially obviates one or more problems due to limitations and disadvantages of the related art.

An object of the present invention is to provide a torque control wrench for both a left-hand thread and a right-hand thread, which can tighten a bolt with a precise torque by setting a torque value matching the strength of a bolt and, if a tightening torque equal to or greater than the set torque value is applied to the bolt, discontinuing rotation of a socket that fits around the bolt by idle rotation of a clutch shaft transferring rotational force of a handle to the socket.

Another object of the present invention is to provide a torque control wrench for both a left-hand thread and a right-hand thread, which can tighten or loosen a bolt irrespective of the thread direction of the bolt.

A further object of the present invention is to provide a torque control wrench for both a left-hand thread and a right-hand thread, which has a transmission unit for changing the rotation speed of a handle to strong force to thereby facilitate tightening or loosening of a bolt even when small force is applied to the handle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a torque control wrench for both a left-hand thread and a right-hand thread includes a wrench unit having a transmission unit, a movable shaft engaged with the transmission unit, for rotating the transmission unit with external force, and a socket for receiving rotational force at a rotation speed changed by the transmission unit and tightening or loosening a bolt with the received rotational force, a handle for generating the rotational force with which the socket tightens or loosens the bolt, and a torque controller between the wrench unit and the handle, for controlling a torque applied from the handle to the socket, including a clutch for rotating along with rotation of the handle and thus rotating the movable shaft and, if a torque equal to or greater than a preset torque value is applied, rotating idly, and a clutch torque controller for controlling the torque applied from the handle to the clutch.

The clutch may include a housing shaped into a cylinder opened at one end of the housing, including an engagement protrusion at the other end of the housing, for rotating the movable shaft and a catching protrusion with a semi-circular section protruding in a radial direction from an inner surface of the housing facing the engagement protrusion, and a clutch shaft including a catching groove formed in correspondence with the catching protrusion, for accommodating the catching protrusion, and a handle engagement portion for engaging with the handle to rotate along with rotation of the handle.

The clutch torque controller may include a first multi-threaded portion formed on the inner circumferential surface of the housing, a torque control plate forming a through hole through which the clutch shaft is extended and having a second multi-threaded portion screwed into the first multi-threaded portion, an elastic member around an outer circumferential surface of the clutch shaft, for providing elastic force to the clutch shaft so that the catching protrusion and the catching groove are brought into close contact, and a control lever at the torque control plate, for controlling a torque applied to the clutch shaft by rotating the torque control plate along the first multi-threaded portion and thus pressing and releasing the elastic member.

The torque control wrench for both a left-hand thread and a right-hand thread may further include a fixing cover for covering the opened end of the housing, having an auxiliary through hole for allowing the clutch shaft to be extended through the auxiliary through hole, and an elongated slit penetrated for allowing the control lever to be extended through the elongated slit and regulating a movement range of the control lever.

The elastic member may include a plate spring.

The wrench unit may further include a rotation controller for controlling forward and reverse rotations of the movable shaft.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
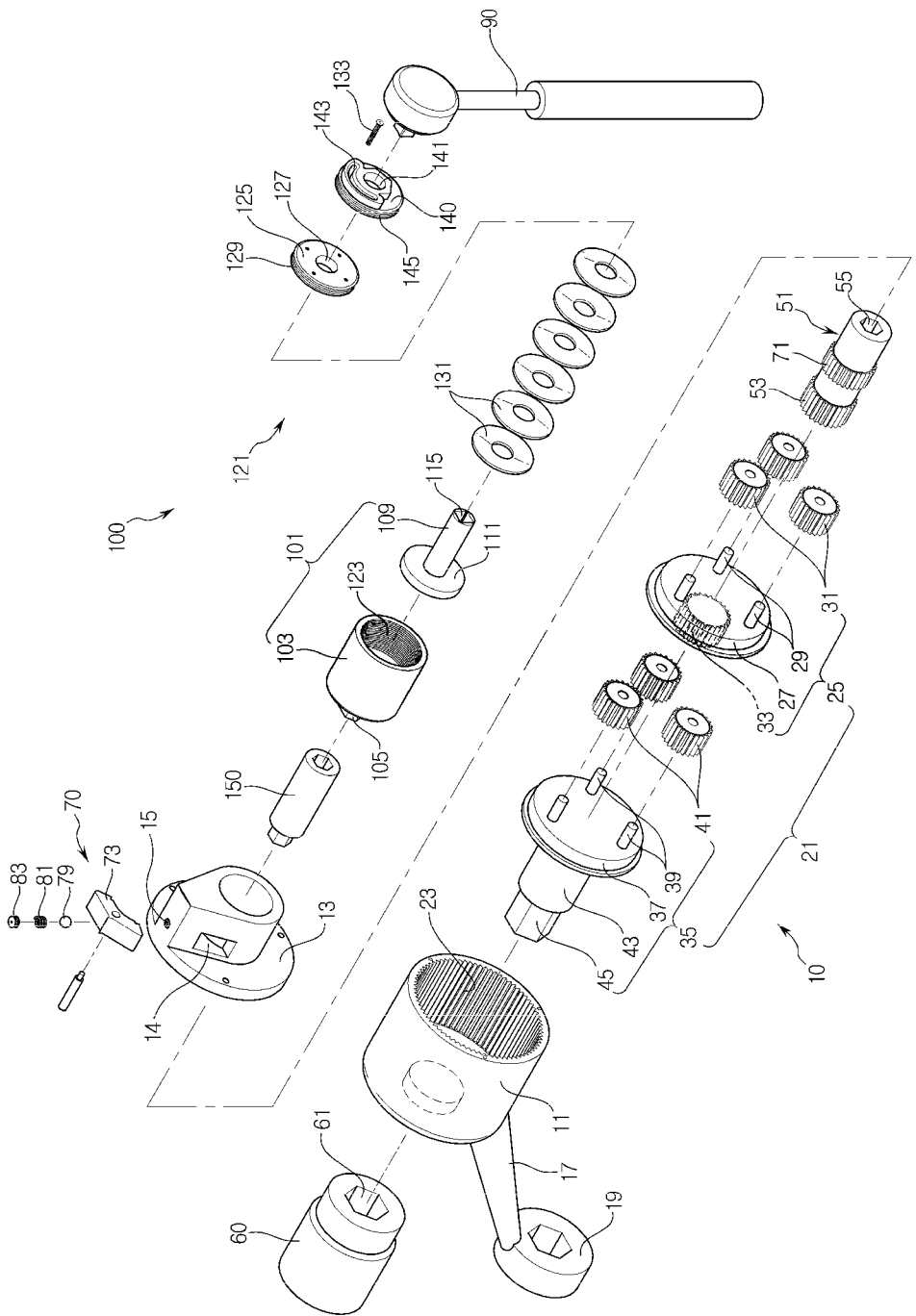
FIG. 1 is an exploded perspective view illustrating the structure of a torque control wrench for both a left-hand thread and a right-hand thread according to an embodiment of the present invention.
Figure 2:
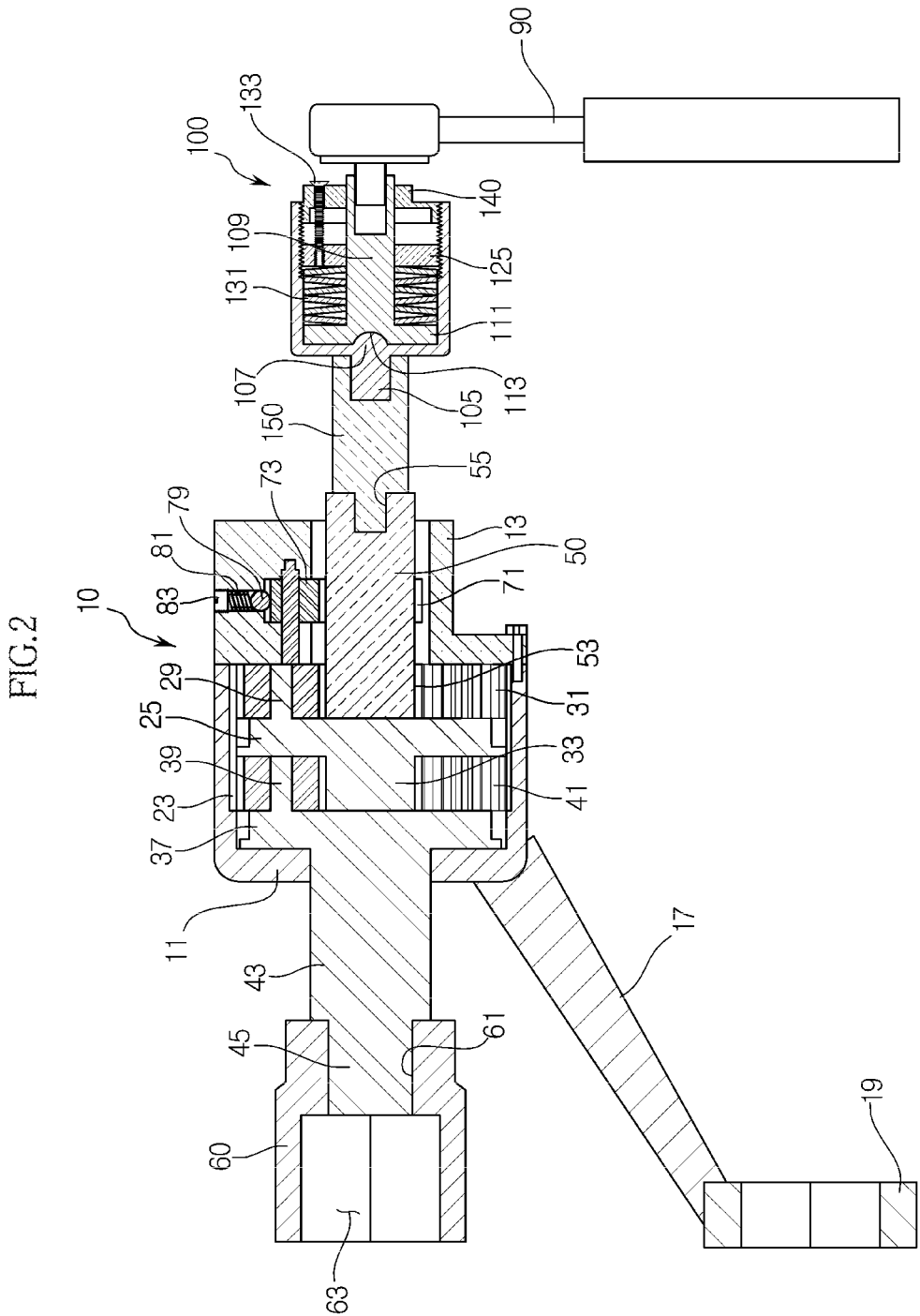
FIG. 2 is a sectional view illustrating the structure of the torque control wrench for both a left-hand thread and a right-hand thread according to the embodiment of the present invention.

FIG. 1 is an exploded perspective view illustrating the structure of a torque control wrench for both a left-hand thread and a right-hand thread according to an embodiment of the present invention and FIG. 2 is a sectional view illustrating the structure of the torque control wrench for both a left-hand thread and a right-hand thread according to the embodiment of the present invention.

Referring to FIGS. 1 and 2, the torque control wrench for both a left-hand thread and a right-hand thread according to the embodiment of the present invention includes a wrench unit 10 for tightening or loosening a bolt by means of a transmission unit 21, a handle 90 for generating rotational force with which the wrench unit 10 tightens or loosens the bolt, and a torque controller 100 for controlling a torque transferred from the handle 90 to the wrench unit 10.

The following description is given with the appreciation that a direction toward a socket 60 is defined as a forward direction and a direction toward the handle 90 is defined as a backward direction.

The wrench unit 10 is a part that fits around a bolt to tighten or loosen the bolt. The wrench unit 10 includes a cylindrical body 11, the transmission unit 21 inside the body 11, a movable shaft 51 engaged with the transmission unit 21, for rotating the transmission unit 21 with external force, the socket 60 for receiving rotational force at a rotation speed changed by the transmission unit 21 and tightening or loosening the bolt with the received rotational force, and a rotation controller 70 for controlling forward or reverse rotation of the movable shaft 51.

The body 11 is formed into a hollow cylinder and thus accommodates the transmission unit 21. That is, as both end portions of the body 11 are open, the transmission unit 21 is contained inside the body 11 and a rear end portion of the body 11 facing toward the torque controller 100 is capped with a support cap 13 that accommodates the rotation controller 70.

A support member 17 is extended to a predetermined length from an outer circumferential surface of the body 11 and is provided, at an end portion thereof, with a holding cup 19. When the socket 60 of the wrench unit 10 fits around a bolt of a tire, the holding cup 19 is put on another bolt near to the bolt to prevent rotation of the body 11, while the socket 60 is tightening or loosening the bolt.

Inside the body 11, the transmission unit 21 increases force with which to tighten or loosen the bolt by changing the speed of external rotational force.

The transmission unit 21 includes a guide gear 23 formed on an inner circumferential surface of the body 11, a first transmission 25 having a plurality of first planet gears 31 engaged with the guide gear 23, and a second transmission 35 having a plurality of second planet gears 41 engaged with the guide gear 23.

The first transmission 25 includes a circular first transmission plate 27 with a plurality of first shaft pins 29 spaced from one another by a predetermined distance on a rear surface thereof, the plurality of first planet gears 31 rotatably engaged with the plurality of first shaft pins 29, and a sun gear 33 formed at the center of a frontal surface of the first transmission plate 27.

The second transmission 35 includes a circular second transmission plate 37 with a plurality of second shaft pins 39 spaced from one another by a predetermined distance on a rear surface thereof, the plurality of second planet gears 41 rotatably engaged with the plurality of second shaft pins 39, a transmission shaft 43 extended from a frontal surface of the second transmission plate 37, and a polygonal engagement portion 45 formed on an end portion of the transmission shaft 43.

When the thus-configured first and second transmissions 25 and 35 are installed inside the body 11, the plurality of first and second planet gears 31 and 41 are brought into engagement with the guide gear 23 on the inner circumferential surface of the body 11 and, at the same time, the plurality of second planet gears 41 of the second transmission 35 are brought into engagement with the sun gear 33 of the first transmission 25.

The movable shaft 51 has a movable gear 53 formed on an end portion thereof and an engagement hole 55 formed on the other end portion thereof, for engaging with the torque controller 100.

Therefore, the movable gear 53 of the movable shaft is engaged among the plurality of first planet gears 31 and thus rotates the plurality of first planet gears 31 with external rotational force.

As the movable gear 53 is rotated by the external rotational force, the plurality of first planet gears 31 are also rotated along with the guide gear 23 of the body 11, thus rotating the sun gear 33 of the first transmission plate 27. The resulting rotation of the plurality of second planet gears 41 engaged with the sun gear 33 leads to rotation of the engagement portion 45 of the transmission shaft 43.

The socket 60 functions to tighten or loosen a bolt of a tire with rotational force having a rotation speed changed by the transmission unit 21. The socket 60 has an engagement groove 61 formed on a rear end portion thereof, for engaging with the engagement portion 45 of the transmission shaft 43 and a bolt retaining groove 63 on a frontal end portion thereof, for retaining a bolt.

The rotation controller 70 controls forward and reverse rotations of the movable shaft 51.

Figure 3:
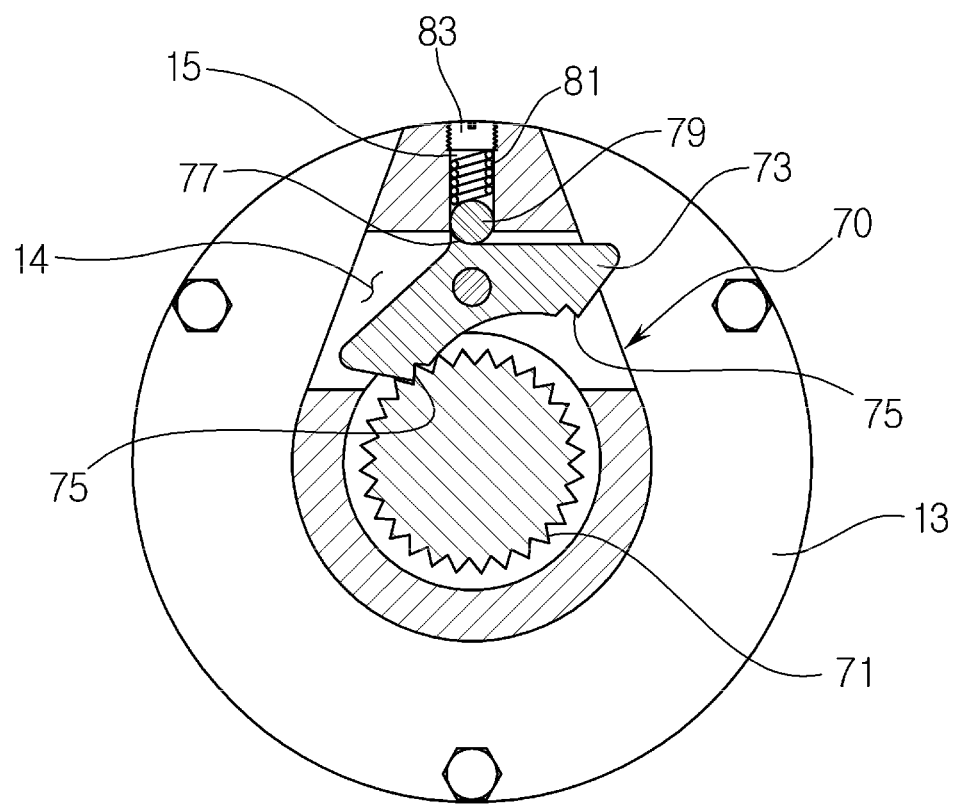
FIG. 3 is a sectional view illustrating the structure of a rotation controller according to an embodiment of the present invention.

FIG. 3 is a sectional view illustrating the structure of the rotation controller according to an embodiment of the present invention.

Referring to FIG. 3, the rotation controller 70 includes gear teeth 71 formed on an outer circumferential surface of the movable shaft 51, a latch 73 that is rotatably supported by a shaft within a retainer 14 of the support cap 13 and has a pair of catching grooves 75 formed on the bottom surface of both end portions thereof, for catching the gear teeth 71, and a protrusion 77 formed at a top end portion thereof, a ball 79 fit into an engagement hole 15 that is vertically penetrated toward the retainer 14 of the support cap 13, for selectively holding both sides of the protrusion 77 of the latch 73, a spring 81 for elastically supporting the ball 79, and an engagement member 83 inserted into the engagement hole 15 to support the spring 81.

In the rotation controller 70 having the above-described configuration, when a left end of the latch 73 comes down and thus the gear teeth 71 are caught in a catching groove 75, the movable shaft 51 rotates counter-clockwise, not clockwise due to the latch 73 and the ball 79 that holds the latch 73.

On the other hand, if a right end of the latch 73 comes down and thus the gear teeth 71 are caught in the other catching groove 75, the movable shaft 51 rotates clockwise, not counter-clockwise.

That is, the forward and reverse rotations of the movable shaft 51 are controlled by the latch 73 and the gear teeth 71.

Meanwhile, the handle 90 generates rotational force with which the socket 60 tightens or loosens a bolt.

That is, the handle 90 generates rotational force in engagement with the torque controller 100 coupled to the movable shaft 51. As the rotational force is transferred to the socket 60 through the torque controller 100, the movable shaft 51, and then the transmission unit 21, the socket 60 tightens or loosens a bolt with the rotational force.

The torque controller 100 is interposed between the wrench unit 10 and the handle 90, for controlling a torque applied from the handle 90 to the socket 60.

Figure 4:
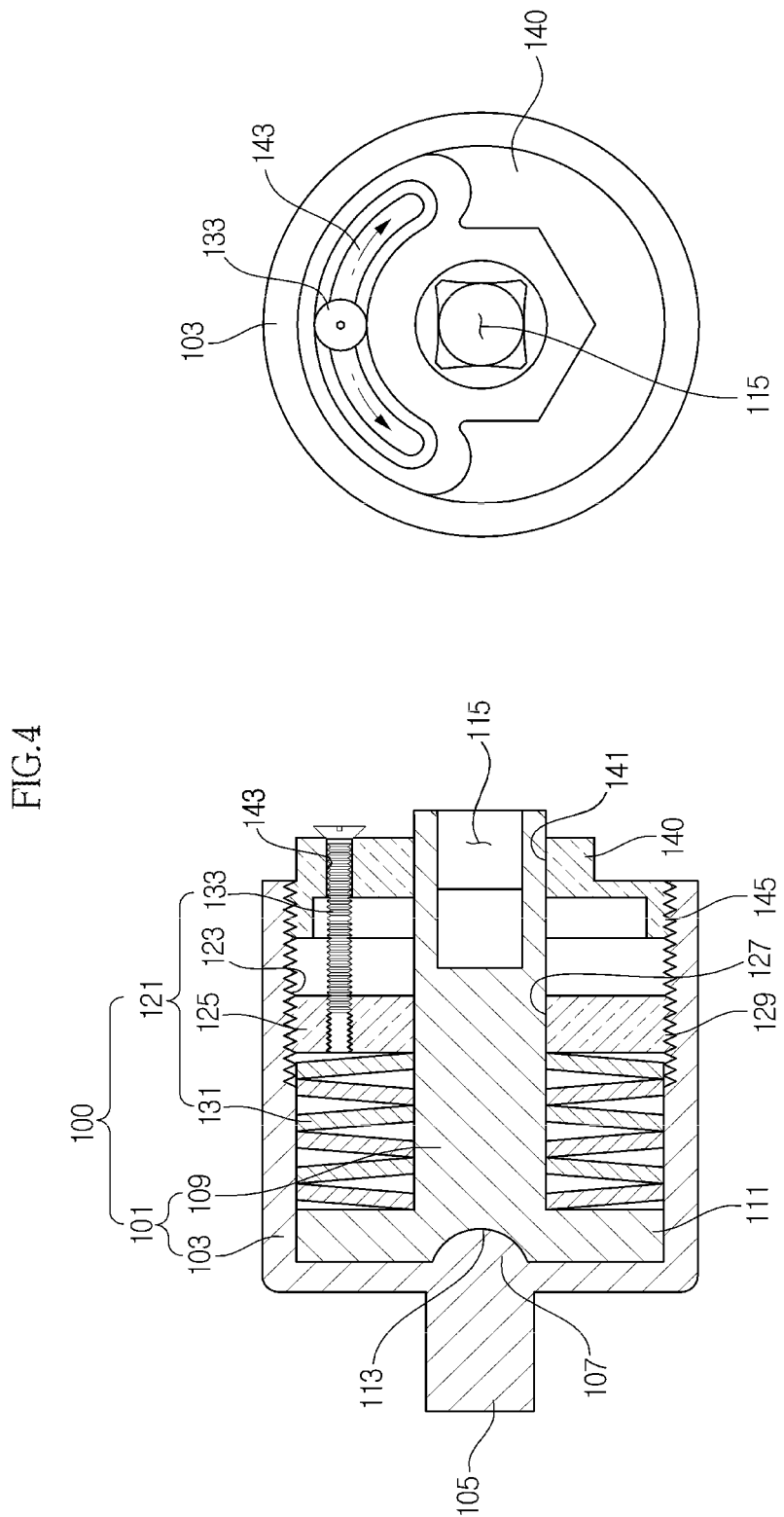
FIG. 4 is a sectional view illustrating the structure of a torque controller according to an embodiment of the present invention.

FIG. 4 is a sectional view illustrating the structure of the torque controller according to an embodiment of the present invention.

Referring to FIG. 4, the torque controller 100 includes a clutch 101 for rotating along with rotation of the handle 90 and thus rotating the movable shaft 51 of the wrench unit 10 and, if a torque equal to or greater than a preset torque value is applied, rotating idly, and a clutch torque controller 121 for controlling the torque applied from the handle 90 to the clutch 101.

The clutch 101 includes a hollow cylindrical housing 130 and a clutch shaft 109 accommodated within the housing 103.

The housing 103 is shaped into a cylinder opened at a rear end thereof. An engagement protrusion 105 is formed on a frontal end of the housing 103, for engaging with the engagement groove 55 of the movable shaft 51, and a catching protrusion 107 with a semi-circular section is protruded in a radial direction from an inner surface of the housing 103 facing the engagement protrusion 105.

As illustrated FIGS. 1 and 2, a coupler 150 may be provided between the movable shaft 51 and the engagement protrusion 105 of the housing 103, for transferring rotational force from the housing 103 to the movable shaft 51.

The clutch shaft 109 includes a contact plate 111 in close contact with the inner surface of the housing 103, on a frontal end portion thereof, a catching groove 113 at the center of the contact plate 111 in correspondence with the catching protrusion 107 of the housing 103, for accommodating the catching protrusion 107, and a handle engagement portion 115 at a rear end portion thereof, for engaging with the handle 90 so that the handle engagement portion 115 may rotate along with rotation of the handle 90.

When the contact plate 111 of the clutch shaft 109 is brought into close contact with the inner surface of the housing 103, the catching protrusion 107 of the housing 103 is accommodated in the catching groove 113 of the contact plate 111. Therefore, as the handle 90 is engaged with the handle engagement portion 115 of the clutch shaft 109 and then the clutch shaft 109 is rotated, the contact plate 111 is also rotated, thereby rotating the catching protrusion 107 within the catching groove 113. The resulting rotation of the housing 103 and the engagement protrusion 105 along with the rotation of the catching protrusion 107 rotates the movable shaft 51 of the wrench unit 10 engaged with the engagement protrusion 105.

If the rotational force of the movable shaft 51 is transferred to the socket 60 and the socket 60 rotates the clutch shaft 109 to further tighten a fully-tightened bolt despite non-rotation of the fully-tightened bolt, the catching protrusion 107 of the housing 103 and the catching groove 113 of the contact plate 111, which have matching semi-circular sections, are slipped off from each other. Thus, the clutch shaft 109 is pushed backward and the catching groove 113 of the contact plate 111 is removed from the catching protrusion 107. Consequently, the clutch shaft 109 rotates idly. In this manner, the full tightening of the bolt is immediately noticed.

Because the catching protrusion 107 and the catching groove 113 have matching semi-circular sections, they may slip off from each other clockwise and counter-clockwise. Thus, bolts with different thread directions such as a left-hand thread and a right-hand thread can be tightened or loosened.

The clutch torque controller 121 includes a first multi-threaded portion 123 formed on the inner circumferential surface of the housing 103, a torque control plate 125 that forms a through hole 127 through which the clutch shaft 109 is extended and has a second multi-threaded portion 129 screwed into the first multi-threaded portion 123, an elastic member 313 around an outer circumferential surface of the clutch shaft 109, for providing elastic force to the clutch shaft 109, and a control lever 133 provided at the torque control plate 125, for rotating the torque control plate 125.

The elastic member 131 has a plurality of plate springs. The elastic member 131 is interposed between the contact plate 111 of the clutch shaft 109 and the torque control plate 125 and provides elastic force to the clutch shaft 109 so that the catching protrusion 107 of the housing 103 is brought into close contact with the catching groove 113 of the contact plate 111.

In the torque controller 100 having the above-described configuration, when the torque control plate 125 is rotated by moving the control lever 133 to the left or to the right, the second multi-threaded portion 129 of the torque control plate 125 moves along the first multi-threaded portion 123 of the housing 103, thereby moving the torque control plate 125 forward or backward within the housing 103.

Owing to the first multi-threaded portion 123, the torque control plate 125 moves a large distance within the housing 103 even though the control level 133 is moved slightly.

As the torque control plate 125 moves forward or backward as described above, the torque control plate 125 presses or releases the elastic member 131. Thus, a torque applied from the handle 90 to the clutch shaft 109 can be controlled.

Specifically, when the torque control plate 125 is moved forward by moving the control lever 133 to the right, the elastic member 131 is pressed, thus pressing the contact plate 111 of the clutch shaft 109 and bringing the catching protrusion 107 of the housing 103 into close contact with the catching groove 113 of the contact plate 111 with great force.

Then if the handle 90 is engaged with the handle engagement portion 115 of the clutch shaft 109 and the clutch shaft 109 is rotated, the engagement protrusion 105 of the housing 103 rotates, thereby rotating the movable shaft 51 engaged with the engagement protrusion 105. Thus the rotational force of the movable shaft 51 is transferred to the socket 60 through the transmission unit 21 and a large torque is applied when the socket 60 tightens or loosens a bolt.

In the opposite case, when the torque control plate 125 is moved backward by moving the control level 133 to the left, the elastic member 131 is released, thus releasing the contact plate 111 of the clutch shaft 109. Hence, the close contact is maintained between the catching protrusion 107 of the housing 103 and the catching groove 113 of the contact plate 111 only by the elastic force of the elastic member 131.

Because great force is not applied for the close contact between the catching protrusion 107 of the housing 103 and the catching groove 113 of the contact plate 111, a small torque is applied when the socket 60 tightens or loosens a bolt, relative to the case where the contact plate 111 is pressed by the elastic member 131.

Meanwhile, a fixing cover 140 covers the opened rear end of the housing 103. That is, a third multi-threaded portion 145 is formed on an outer circumferential surface of the fixing cover 140 and screwed into the first multi-threaded portion 123 of the housing 103.

An auxiliary through hole 141 is formed at the center of a plate surface of the fixing cover 140, for allowing the clutch shaft 109 to be extended therethrough, and an elongated slit 143 is penetrated along an edge of the plate surface of the fixing cover 140, for allowing the control lever 133 to be extended therethrough.

The slit 143 regulates the movement range of the control lever 133. That is, the slit 143 can regulate a range in which the torque control plate 125 presses the elastic member 131 by regulating the movement range of the control lever 133.

Torque values corresponding to bolt specifications may be marked as gradations at the slit 143. Accordingly, a bolt may be tightened after a torque value suitable for the bolt is set by moving the control lever 133 along the slit 143.

Now a description will be given of operational states of the torque control wrench for both a left-hand thread and a right-hand thread having the above configuration according to the embodiment of the present invention.

FIGS. 5 to 8 illustrate operation states of the torque control wrench for both a left-hand thread and a right-hand thread according to the embodiment of the present invention.

Figure 5:
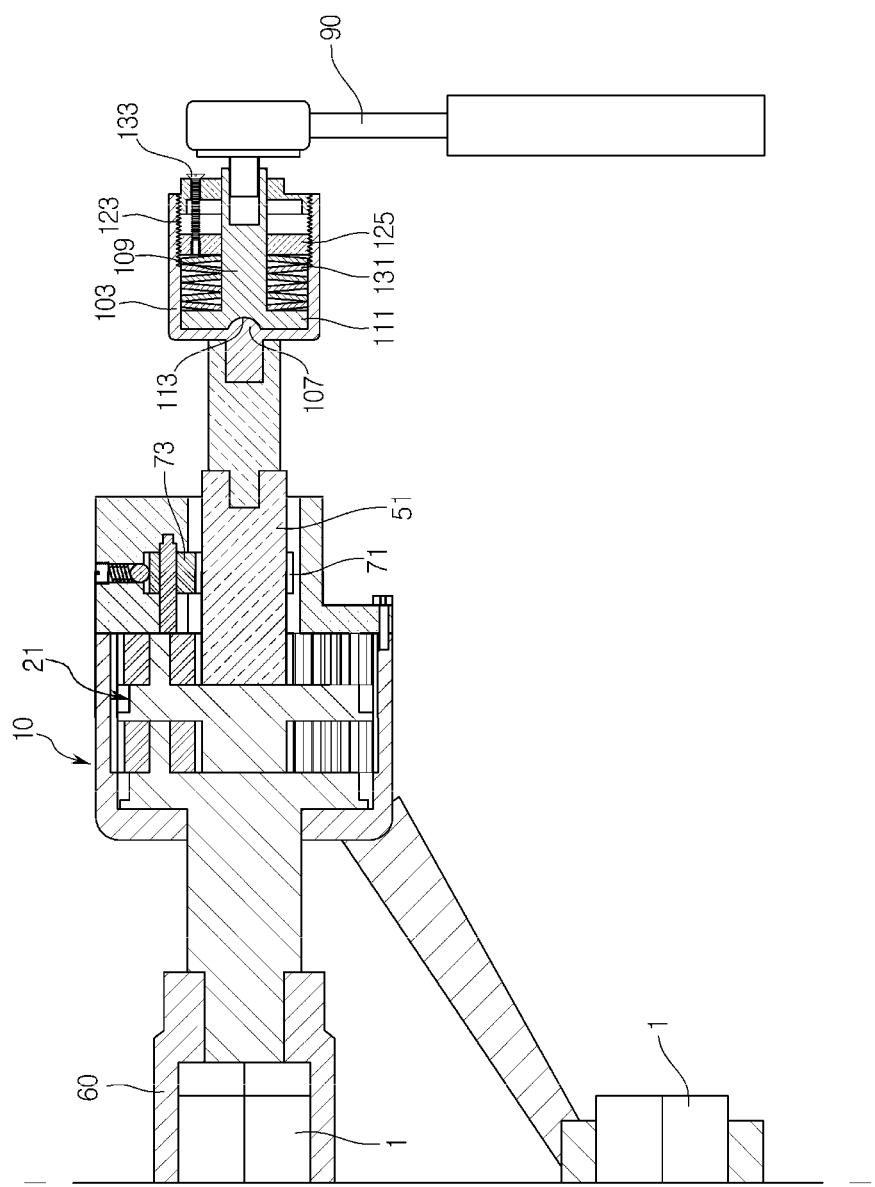
FIGS. 5 to 8 illustrate operation states of the torque control wrench for both a left-hand thread and a right-hand thread according to the embodiment of the present invention.

Referring to FIG. 5, when a bolt 1 is to be tightened with the torque control wrench, it is first determined whether the bolt 1 is a left-hand threaded or right-hand threaded bolt. Then a catching groove (75 in FIG. 3) of the latch 73 is selectively engaged with the gear teeth 71 of the movable shaft 51 so that the movable shaft 51 may rotate in a tightening direction of the bolt 1.

If the control lever 133 is manipulated according to a torque value corresponding to the strength level of the bolt 1, the torque control plate 125 moves along the first multi-threaded portion 123 of the housing 103 forward or backward inside the housing 103 according to the manipulation of the control lever 133. Thus the elastic member 131 is pressed or released by the torque control plate 125, thereby providing elastic force to the contact plate 111 so that the catching groove 113 of the contact plate 111 and the catching protrusion 107 of the housing 103 are brought into close contact.

Figure 6:
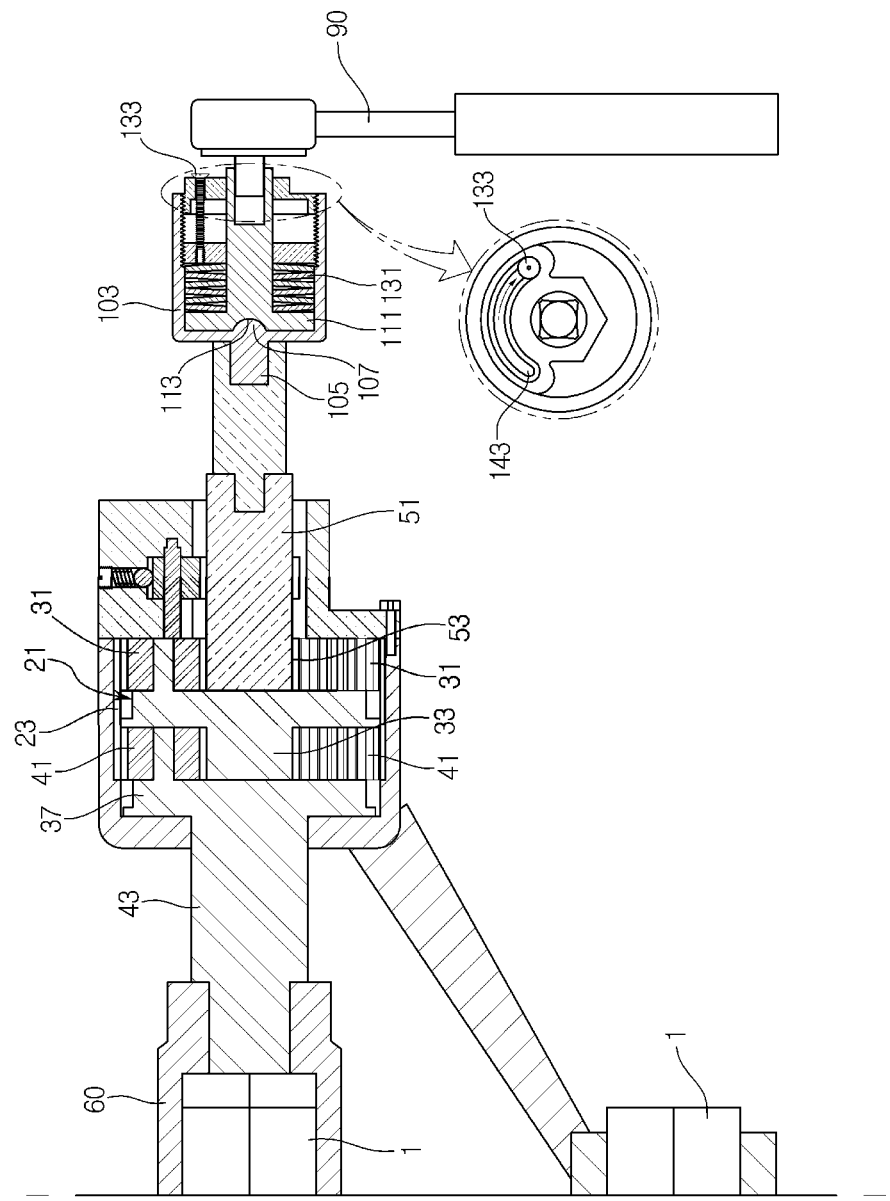
Figure 7:
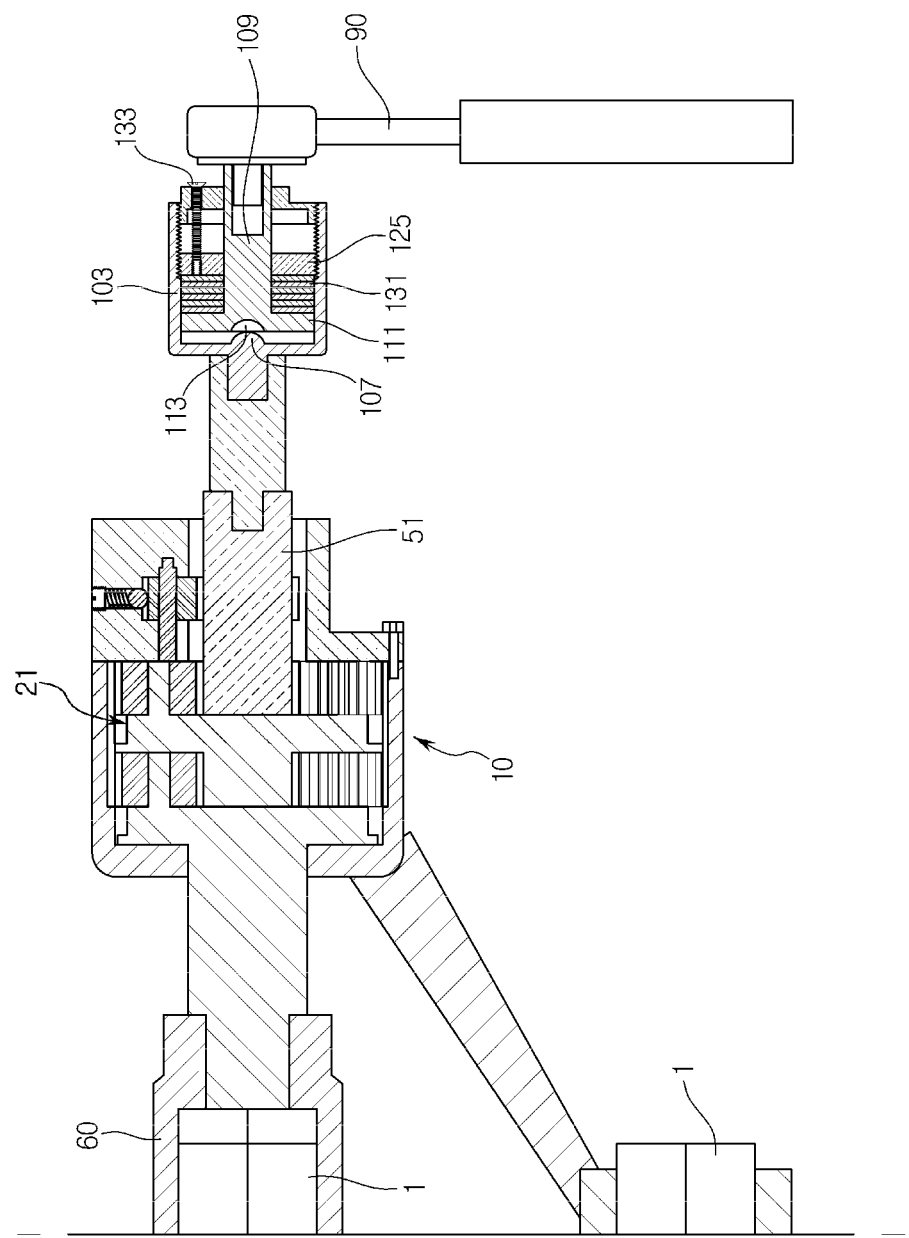

As illustrated in FIG. 6, in the case where the bolt 1 is tightened with a large torque according to the strength of the bolt 1, the control lever 133 is moved to the right along the slit 143 and thus the torque control plate 125 is moved to press the elastic member 131. The pressed elastic member 131, in turn, presses the contact plate 111 of the clutch shaft 109. As a result, the catching protrusion 107 of the housing 103 closely contacts the catching groove 113 of the contact plate 111 with great force.

When the clutch shaft 109 is rotated by rotating the handle 90 engaged with the handle engagement portion 115 of the clutch shaft 109, the housing 103 rotates around the clutch shaft 109 and the movable shaft 51 engaged with the engagement protrusion 105 of the housing 103 rotates. Thus the rotational force of the movable shaft 51 is transferred to the socket 60 through the transmission unit 21 and a large torque is applied when the socket 60 tightens or loosens the bolt 1.

The transmission unit 21 functions to increase force with which the socket 60 tightens or loosens the bolt 1 by changing the rotation speed of the rotational force transferred from the engagement protrusion 105 of the housing 103 to the movable shaft 51.

That is, along with the rotation of the movable shaft 51, the plurality of first planet gears 31 engaged with the movable shaft 51 rotate along the guide gear 23, thus rotating the first transmission plate 27 that fixes the plurality of first planet gears 31. Then the sun gear 33 of the first transmission plate 27 rotates, thus rotating the plurality of second planet gears 41. As the plurality of second planet gears 41 rotate along the guide gear 23, the second transmission plate 37 that fixes the second planet gears 41 is rotated. At the same time, the transmission shaft 43 on the second transmission plate 37 rotates, thus transferring the speed-changed rotational force to the socket 60 engaged with the engagement portion 45 of the transmission shaft 43.

In this manner, while each first planet gear 31 is rotating in engagement with the guide gear 23 and each second planet gear 41 is rotating in engagement with the guide gear 23 and the sun gear 33, the rotation speed thereof decreases in proportion to the number of gear teeth 71, but the rotational force thereof increases. Thus the increased rotational force rotates the socket 60 through the speed adaptation shaft 43, thus tightening the bolt 1.

If the bolt 1 is fully tightened in the above operation, the socket 60 does not rotate any further. In this state, when a torque equal to or larger than the torque value set by the control lever 133 is applied by rotating the handle 90 and thus rotating the clutch shaft 109, the catching groove 113 of the contact plate 111 and the catching protrusion 107 of the housing 103 are slipped off from each other. As a result, the clutch shaft 109 is pushed backward and thus the catching groove 113 of the contact plate 111 is removed from the catching protrusion 107 of the housing 103, thereby causing idle rotation of the clutch shaft 109. Therefore, the fully tightened state of the bolt 1 is noticed.

Figure 8:
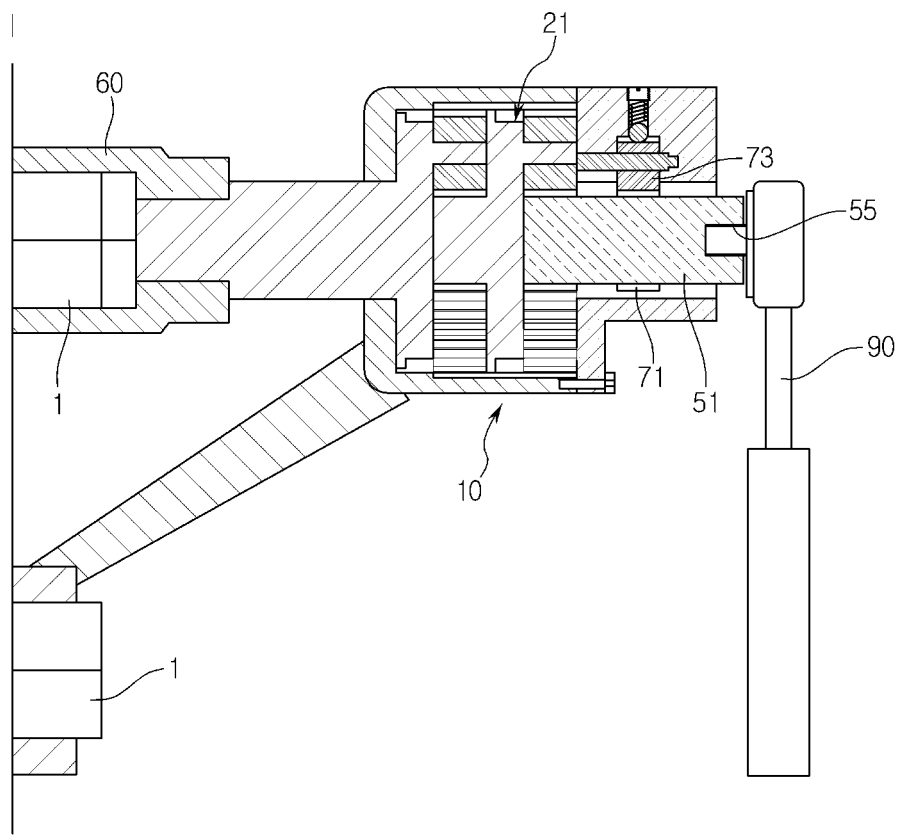
Figure 9:
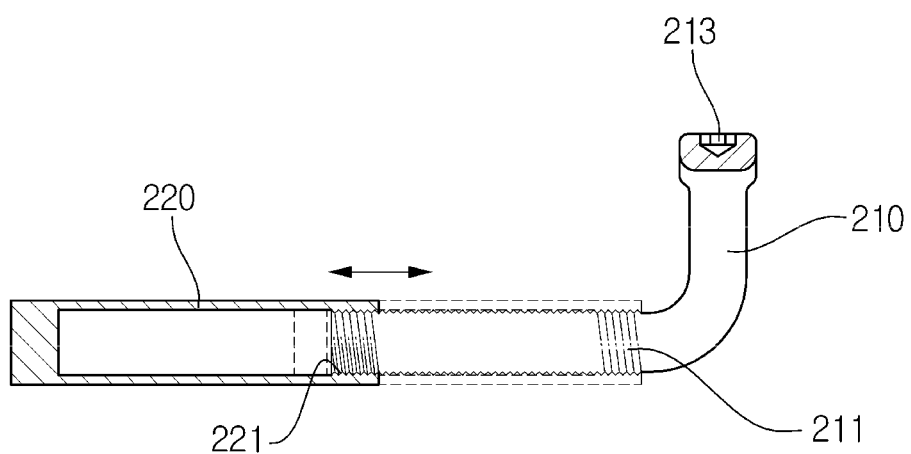
FIG. 9 illustrates a conventional torque wrench.

Meanwhile, when the bolt 1 is to be loosened, the torque controller 100 is removed and then the handle 90 is directly engaged with the engagement groove 55 of the movable shaft 51, as illustrated in FIG. 8.

The other catching groove (75 in FIG. 3) of the latch 73 is engaged with the gear teeth 71 of the movable shaft 51 so that the movable shaft 51 may rotate reversely. When the movable shaft 51 is reversely rotated by manipulating the handle 90, the speed of the reverse rotational force of the movable shaft 51 is changed by the transmission unit 21 and thus strong force is transferred to the socket 60. Therefore, the fully tightened bolt 1 can be loosened with small force.

As is apparent from the above description of the present invention, a torque value can be set according to the strength of a bolt to be tightened. If a tightening torque equal to or larger than the set torque value is applied, rotation of a socket fit around the bolt is discontinued through idle rotation of a clutch shaft that transfers the rotational force of a handle to the socket. Therefore, the bolt can be tightened with a precise torque, while being protected against abrasion.

The present invention increases user convenience because bolts with different thread directions such as a left-hand thread or a light-hand thread can be tightened or loosened.

Furthermore, a bolt can be easily tightened or loosened despite small force applied to a handle because a transmission unit changes the rotation speed of the handle to output strong force.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A torque control wrench for both a left-hand thread and a right-hand thread, comprising:
    a wrench unit including a transmission unit, a movable shaft engaged with the transmission unit, for rotating the transmission unit with external force, and a socket for receiving rotational force at a rotation speed changed by the transmission unit and tightening or loosening a bolt with the received rotational force;
    a handle for generating the rotational force with which the socket tightens or loosens the bolt; and
    a torque controller between the wrench unit and the handle, for controlling a torque applied from the handle to the socket, including a clutch for rotating along with rotation of the handle and thus rotating the movable shaft and, if a torque equal to or greater than a preset torque value is applied, rotating idly, and a clutch torque controller for controlling the torque applied from the handle to the clutch, wherein, the clutch comprises i) a housing shaped into a cylinder opened at one end of the housing, including an engagement protrusion at the other end of the housing, for rotating the movable shaft and a catching protrusion with a semi-circular section protruding in a radial direction from an inner surface of the housing facing the engagement protrusion, and ii) a clutch shaft including a catching groove formed in correspondence with the catching protrusion, for accommodating the catching protrusion, and a handle engagement portion for engaging with the handle to rotate along with rotation of the handle, and the clutch torque controller comprises i) a first multi-threaded portion formed on the inner circumferential surface of the housing, ii) a torque control plate forming a through hole through which the clutch shaft is extended and having a second multi-threaded portion screwed into the first multi-threaded portion, iii) an elastic member around an outer circumferential surface of the clutch shaft, for providing elastic force to the clutch shaft so that the catching protrusion and the catching groove are brought into close contact, and iv) a control lever at the torque control plate, for controlling a torque applied to the clutch shaft by rotating the torque control plate along the first multi-threaded portion and thus pressing and releasing the elastic member.

2. The torque control wrench for both a left-hand thread and a right-hand thread according to claim 1, further comprising a fixing cover for covering the opened end of the housing, having an auxiliary through hole for allowing the clutch shaft to be extended through the auxiliary through hole, and an elongated slit penetrated for allowing the control lever to be extended through the elongated slit and regulating a movement range of the control lever.

3. The torque control wrench for both a left-hand thread and a right-hand thread according to claim 1, wherein the elastic member includes a plate spring.

4. The torque control wrench for both a left-hand thread and a right-hand thread according to claim 1, wherein the wrench unit further includes a rotation controller for controlling forward and reverse rotations of the movable shaft.

* * * * *